Feb. 15, 1949. G. F. LOMELINO 2,461,828
EXTENSION JOINT
Filed May 13, 1946
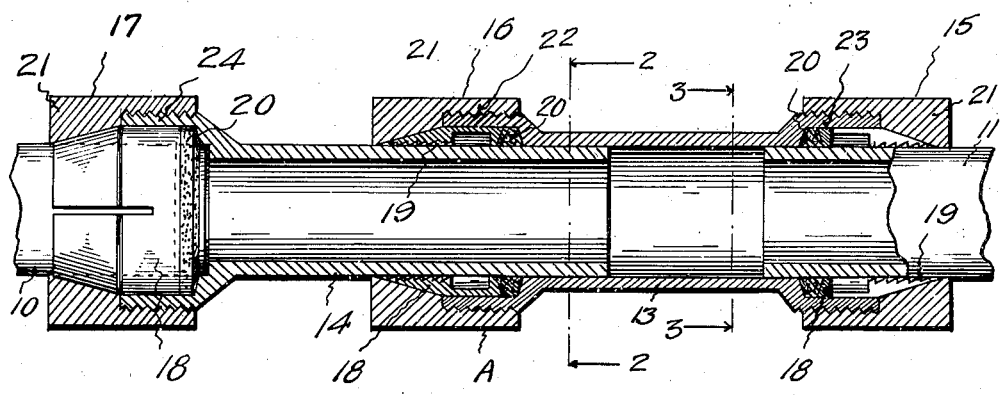
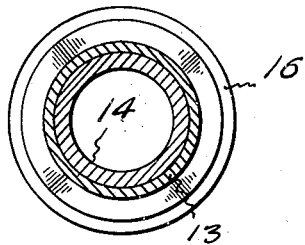
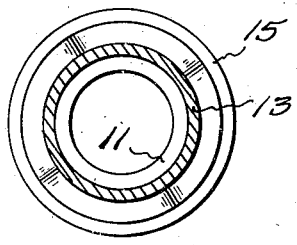
Inventor
GEORGE FREEMAN LOMELINO
Attorney Patented Feb. 15, 1949

2,461,828

UNITED STATES PATENT OFFICE 2,461,828

EXTENSION JOINT

George Freeman Lomelino, Olney, Ill., assignor of one-half to Lawrence E. Ostrom, Olney, Ill.

Application May 13, 1946, Serial No. 669,223

1 Claim. (Cl. 285—2)

This invention relates to an extension joint, and has for one of its objects the production of a simple and efficient means for providing a stiff connection between two lines, such as pipe lines, and the like.

A further object of this invention is the production of a simple and efficient means for providing a stiff connection between two lines such as pipe lines, and the like, wherein the extension joint is slidably or telescopically adjustable to form a junction between two pipe lines without forcing the pipe lines out of alignment.

Further objects and advantages of this invention will appear throughout the following specification and claim.

In the drawing:

Figure 1 is a longitudinal sectional view through the extension joint, certain parts being shown in side elevation;

Figure 2 is a transverse sectional view taken on line 2—2 of Figure 1;

Figure 3 is a transverse sectional view taken on line 3—3 of Figure 1.

By referring to the drawing, it will be noted that 10 designates one section of pipe to be connected to the expansion joint A, and 11 designates the other section of pipe to be connected to the expansion joint A.

The expansion joint A comprises a primary section 13 in which is slidably fitted the auxiliary section 14. The primary section 13 carries a coupling 15 at one end, preferably of the type shown in my application relating to a Coupling, filed April 24, 1946, Serial Number 664,511, now Patent No. 2,453,024. This coupling 15 is clamped securely over the pipe 11 which is slidably fitted therein to provide a sealed joint. The primary section 13 carries a coupling 16 at its opposite end, also preferably of the type above identified and similar to the coupling 15, which coupling 16 slidably receives one end of the auxiliary section 14 of the joint A. This coupling 16 clamps and seals the primary section 13 and the auxiliary section 14 in clamped adjustable relation and firmly locks the sections in a proper adjusted relation to provide a stiff connection between the sections of the joint.

The auxiliary section 14 carries a coupling 17 at its opposite end which slidably engages the pipe 10 for firmly and efficiently sealing the connection between the auxiliary section 14 and the pipe 10 thereby completing the stiff connection between the pipes 10 and 11.

From the foregoing description it will be seen that a simple and efficient means is provided to produce a stiff connection between the lines of pipe and the like, whether these pipes are in alignment or the aligned pipes are carried by two parallel lines. It should be noted that no threads are necessary on the pipes 10 and 11 where they engage the couplings 17 and 15, since the connection is slidable and the couplings are clamped firmly in position when the proper relative adjustment has been made to provide a proper length for the extension joint A to connect the pipes 10 and 11.

As set forth in my application Serial Number 664,511, it will be noted that each coupling 15, 16 and 17 comprises a gripping thimble 18 which fits over the elements to be adjusted, each thimble 18 comprising a circular body having a split tapered end, the inner face of which is provided with suitable gripping teeth 19. These teeth 19 bite into the elements to be adjusted, such as the auxiliary section 14 of the extension joint A, and the pipes 10 and 11 as shown in Figure 1. A compressible packing ring 20 is carried by each coupling, and this packing ring 20 is adapted to be compressed by the abutting thimble 18, as the clamping sleeve 21 of each coupling is threaded upon its support, such as the threaded opposite ends 22 and 23 of the primary section 13 at the threaded end 24 of the auxiliary section 14. These teeth 19 only grip the pipes 10 and 11 and the adjustable portion of the section 14 after the ring 20 has been compressed to properly seal the coupling after which time the teeth 19 bite into their supports to lock the pipes 10 and 11 and the section 14 in a fixed adjusted position.

Having described the invention, what is claimed as new is:

An extension joint of the class described comprising a primary section having an elongated smooth central straight bore extending from end to end, said primary section having externally threaded opposite ends enlarged relative to the central bore, a pipe section slidably fitting in one end of said primary section, a second pipe section slidably fitting in the opposite end of said primary section, a packing ring carried within each externally threaded end and sealing the respective pipe sections in the ends of the primary section, a coupling threaded upon each externally threaded end of the primary section, and a gripping thimble fitting in each coupling and engaging the packing rings for compressing the packing rings and firmly gripping the pipe sections to lock the pipe sections against movement relative to the primary section.

GEORGE FREEMAN LOMELINO.

(References on following page)

REFERENCES CITED

The following references are of record in the file of this patent:

UNITED STATES PATENTS

| Number | Name | Date |
|---|---|---|
| 130,216 | Goodale | Aug. 6, 1872 |
| 433,489 | Patts | Aug. 5, 1890 |
| 827,951 | Anderson | Aug. 7, 1906 |
| 1,030,237 | Hall | June 18, 1912 |

FOREIGN PATENTS

| Number | Country | Date |
|---|---|---|
| 17,848 | Great Britain | 1895 |
| 380,035 | Great Britain | 1932 |
| 406,685 | Great Britain | 1933 |